United States Patent
Kumar et al.

(10) Patent No.: US 8,055,611 B1
(45) Date of Patent: Nov. 8, 2011

(54) SIMPLIFIED XPATH EVALUATION IN XML DOCUMENT VALIDATION

(75) Inventors: Arun Kumar, Bangalore (IN); Ramesh Nethi, Bangalore (IN)

(73) Assignee: Sonoa Networks India (PVT) Ltd., Bangalore (IN)

( * ) Notice: Subject to any disclaimer, the term of this patent is extended or adjusted under 35 U.S.C. 154(b) by 882 days.

(21) Appl. No.: 12/058,889

(22) Filed: Mar. 31, 2008

(51) Int. Cl.
*G06F 17/30* (2006.01)

(52) U.S. Cl. ...................................... 707/607

(58) Field of Classification Search .............. 707/2, 114, 707/200, 607
See application file for complete search history.

(56) References Cited

U.S. PATENT DOCUMENTS

| | | |
|---|---|---|
| 2006/0101073 A1 | 5/2006 | Popa et al. |
| 2008/0016122 A1* | 1/2008 | Liu et al. ................ 707/200 |
| 2008/0216052 A1* | 9/2008 | Hejlsberg et al. ............. 717/114 |

FOREIGN PATENT DOCUMENTS

WO   WO/2007/013079 A2   2/2007

* cited by examiner

*Primary Examiner* — Etienne Leroux
(74) *Attorney, Agent, or Firm* — Kanika Radhakrishnan; Evergreen Valley Law Group, P.C.

(57) ABSTRACT

Simplified XPath evaluation in Extensible Markup Language (XML) document validation. XML schema is compiled into a one dimensional array of schema nodes, where a schema node represents a complex/simple type definition in the XML scheme. Identity constraints are processed during compilation and Xpath expressions within these constraints are extracted and parsed. Further, these Xpath expressions are evaluated at compilation time to identify the schema nodes corresponding to the XML nodes referred in the identity constraints. The identity constraints are then enforced at runtime without the need to evaluate the Xpath expressions at the runtime.

12 Claims, 4 Drawing Sheets

SIMPLIFIED XPATH EVALUATION IN XML DOCUMENT VALIDATION

BACKGROUND

1. Technical Field

Embodiments of the invention relate generally to information processing and more particularly validating Extensible Markup Language (XML) documents.

2. Prior Art

Over the last few years, the use of XML as a data exchange format has increased tremendously. XML schema is a language or a model for describing the structure and constraining the contents of an XML document. The constraints defined for the XML documents follow the basic syntax constraints imposed by XML. An XML schema provides a view of an XML document at a relatively high level of abstraction.

There are languages developed specifically to express XML schemas. The Document Type Definition (DTD) language, which is native to the XML specification, is a schema language that is of relatively limited capability, but has other uses in XML aside from the expression of schemas. Another very popular and more expressive XML schema language is XML Schema standardized by World Wide Web Consortium (W3C). The mechanism for associating an XML document with an XML schema varies according to the schema language. The process of checking to find out if an XML document conforms to an XML schema is called validation. XML Documents are considered valid if the XML documents satisfy the requirements of the XML schema with which they have been associated.

In a typical XML document validation, there may be identity constraints which need to be identified and evaluated. Identity constraint definitions provide for uniqueness and reference constraints with respect to the contents of multiple elements and attributes. Identity constraints in XML schema are expressed using 'unique', 'key' and 'keyref' constructs. The construct 'unique' is used to specify that a particular element or attribute value, or a combination of one or more of these, is unique within the given scope of an element. The construct 'key' can serve the same purpose as 'unique'. However, the 'key' construct in combination with 'keyref' construct allows one to specify referential integrity constraints. In other words, the 'key' construct is used to specify that the values of selected element or attribute are unique in a given scope and 'keyref' construct is used to specify that selected element or attribute value has a corresponding element or attribute with the same value in the subset identified by the 'key' construct. The 'key' and 'keyref' constructs are further related by having 'keyref' construct referring to the name of 'key' construct, which is unique in a given scope.

Usage of identity constraints is explained using the following example. Consider an XML document including list of customers and the orders placed by these customers. Every customer has a unique customer ID. Every order also has a unique order ID. In addition, an order also has the ID of a customer who placed the order. There may be multiple orders referring to the same customer ID. These constraints can be specified in the XML schema using XML schema identity constraints. The construct 'unique' or 'key' can be used to specify that customers and orders have unique IDs. Further, 'keyref' construct can be used to specify that every order refers to a valid customer identified by the 'key' construct. XML schema uses a subset of Xpath 1.0 language to express the elements or attributes referred in the 'unique', 'key' and 'keyref' constructs.

In a conventional approach for enforcing identity constraints, the XPath expressions are evaluated and XML nodes referred in identity constraints are identified at the runtime of an XML processing system. An XPath processor in the XML validator is needed to evaluate the XPath expressions at the runtime and further enforce the identity constraints. The Simple API for XML (SAX) events are fed into the XPath processor to validate the XPath expressions at runtime and subsequently enforce the identity constraints. Validating XPath expressions at runtime using an XPath processor and enforcing identity constraints significantly degrades the performance of the XML processing system which constitutes to inefficiency in terms of time and cost.

In light of the foregoing discussions, there is a need for efficient XPath evaluation in XML document validation.

SUMMARY

Embodiments of the invention described herein provide a computer implemented method, system and a machine-readable medium product for XPath evaluation in Extensible Markup Language (XML) document validation without the overhead of a full-fledged XPath processor.

An exemplary embodiment of the invention provides a method for evaluating XPath expressions in XML document validation. One or more schema nodes are identified in a compiled XML schema corresponding to the XML nodes referred in identity constraints as one or more XPath expressions. These one or more XPath expressions are evaluated at the compile time. Further, the one or more schema nodes identified are marked at compile time.

An exemplary embodiment of the invention provides a system for evaluating XPath expressions in XML document validation. The system includes an identifying module, in an XML schema compiler, for identifying one or more schema nodes in a compiled XML schema corresponding to the XML nodes referred in identity constraints as one or more XPath expressions. A marking module in the identifying module marks the one or more schema nodes identified at compile time. Further, system includes an identity constraint enforcing module, in an XML schema validator, for enforcing the identity constraints without evaluating XPath expressions at runtime.

An exemplary embodiment of the invention provides a machine-readable medium product for evaluating XPath expressions in XML document validation. The machine-readable medium product includes instructions operable to cause a programmable processor to perform identifying one or more schema nodes in a compiled XML schema corresponding to the XML nodes referred in identity constraints as one or more XPath expressions, wherein one or more XPath expressions are evaluated at the compile time; and marking the one or more schema nodes identified at compile time.

Other aspects and example embodiments are provided in the Figures and the Detailed Description that follows.

DETAILED DESCRIPTION OF THE EMBODIMENTS

Embodiments of the invention described herein provide a computer implemented method, system and a machine-readable medium product for XPath evaluation in Extensible Markup Language (XML) document validation without the overhead of a full-fledged XPath processor.

Figure 1:
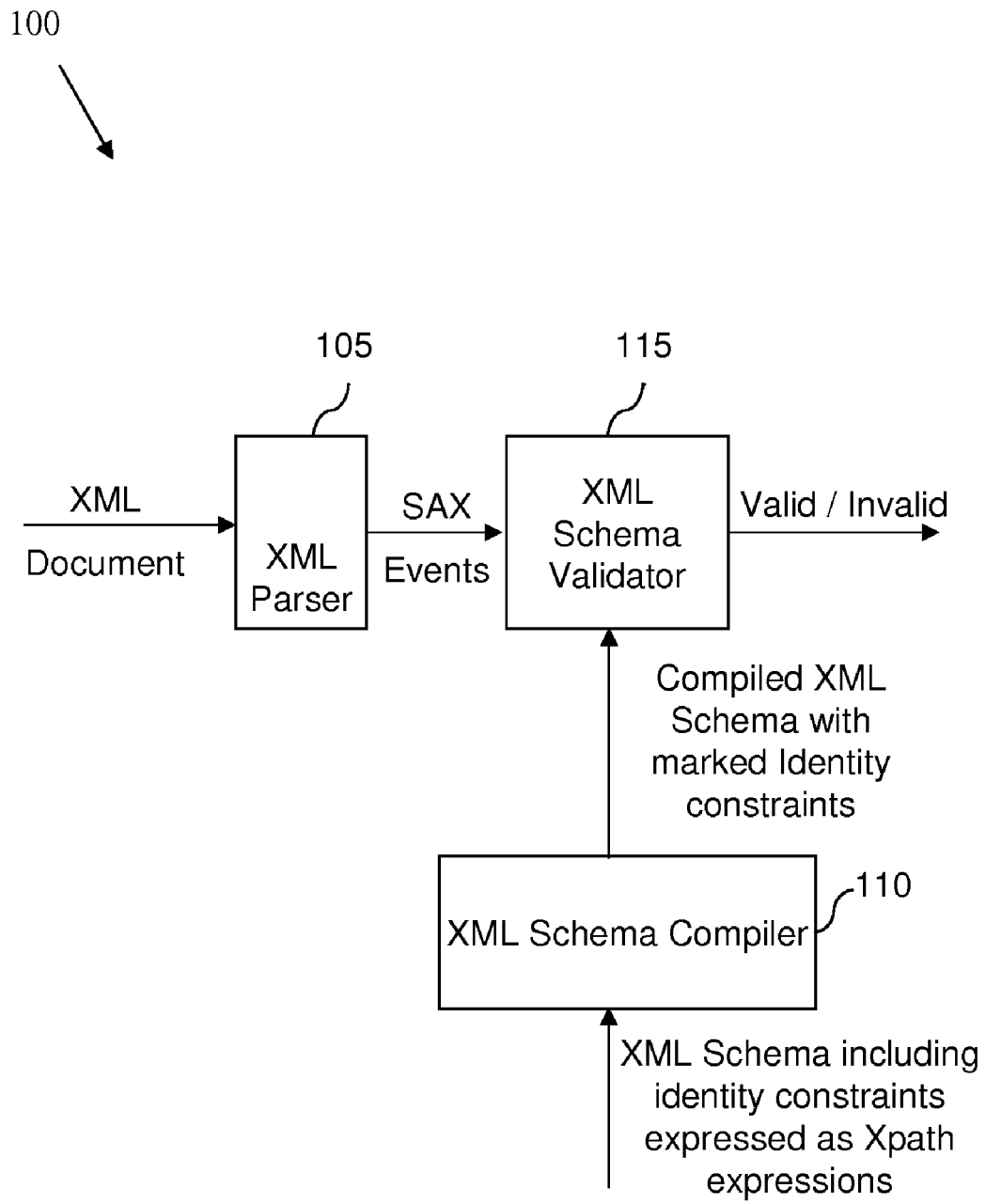
FIG. 1 is a block diagram of an environment in accordance with an embodiment of the invention.

FIG. 1 is a block diagram of an environment 100 according to an embodiment of the invention. Environment 100 includes an XML parser 105 for parsing an XML document, an XML schema compiler 110 for compiling XML schema and an XML schema validator 115 for validating the XML document according to the XML schema. In an embodiment of the invention, XML parser 105 receives several online streams of XML documents. XML parser 105 may include an application program interface (API), for example, Simple API for XML (SAX), for parsing the XML document. XML parser 105 parses an XML document to create SAX events.

Further, XML schema compiler 110 receives an XML schema and compiles the XML schema. The XML schema includes identity constraints expressed using XPath expressions. The compiled XML schema is fed into the XML schema validator 115.

XML schema validator 115 subscribes to SAX events from the XML parser 105 and validates input XML document according the constraints expressed in the XML schema.

In various embodiments of the invention, identity constraints in XML schema are expressed using 'unique', 'key' and 'keyref' constructs. The 'unique' construct is used to specify that a particular element or attribute value, or a combination of one or more of these, is unique within the given scope of an XML document. The 'key' construct can serve the same purpose as 'unique'. However, the 'key' construct in combination with 'keyref' construct allows one to specify referential integrity constraints. In other words, the 'key' construct is used to specify that the values of selected element or attribute are unique in a given scope and 'keyref' construct is used to specify that selected element or attribute value has a corresponding element or attribute with the same value in the subset identified by the 'key' construct. The 'key' and 'keyref' constructs are further related by having 'keyref' construct referring to the name of 'key' construct, which is unique in a given scope.

A 'selector' element in the 'key' construct specifies an XPath expression that identifies a set of child elements included within the declared element to which the constraint applies. A 'field' element in the 'key' construct specifies an XPath expression relative to each element selected by a 'selector'. There can be more than one 'field' element in the 'key' construct. Similarly, the 'keyref' construct allows 'selector' and 'field' elements to specify the Xpath expressions corresponding to the referenced element or attribute values. In an embodiment of the invention, these XPath expressions are evaluated during the compilation of XML schema itself.

Figure 2:
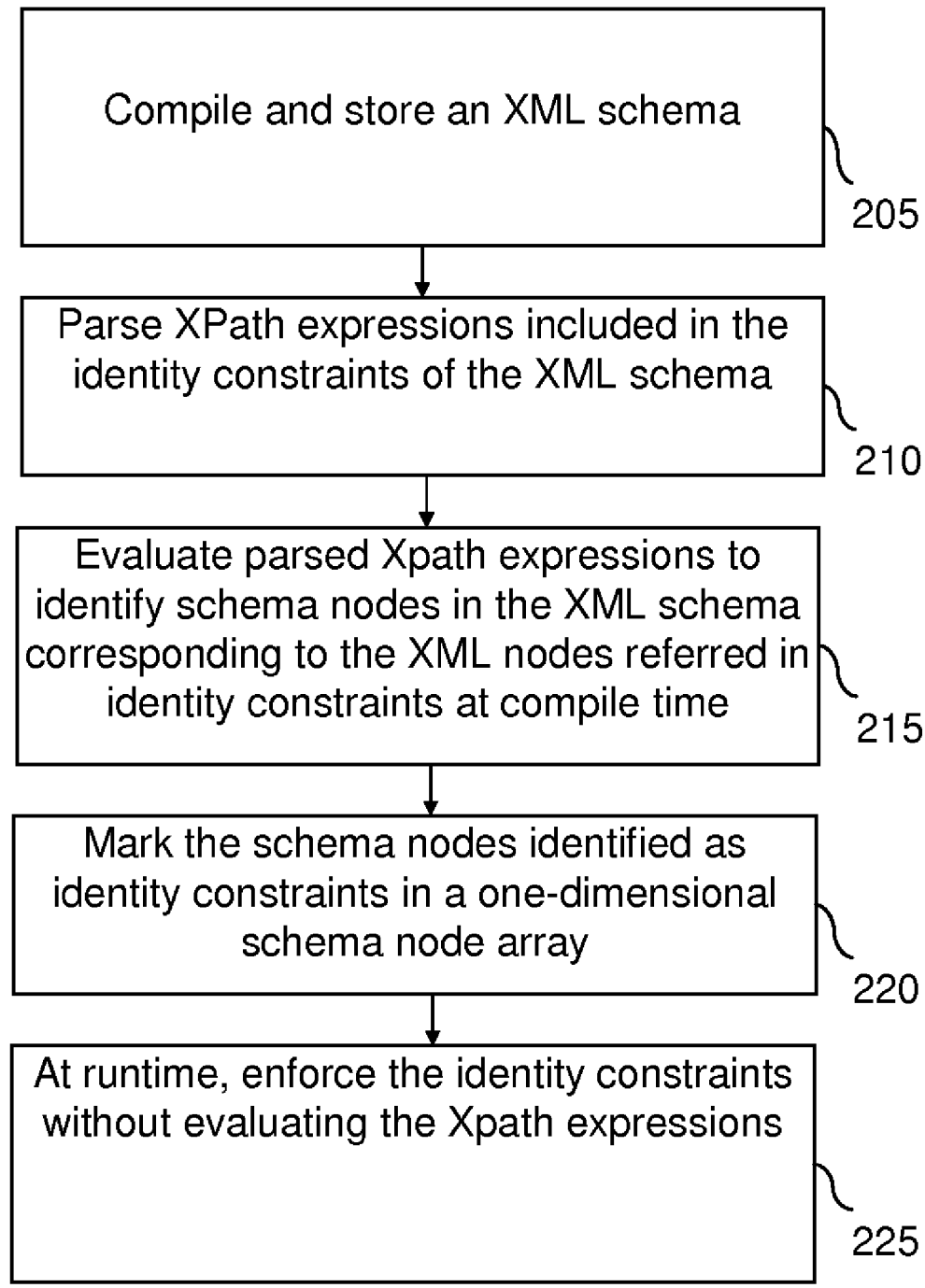
FIG. 2 is a flow diagram illustrating the steps performed in a method for evaluating XPath expressions in XML document validation according to an embodiment of the invention.

FIG. 2 is a flow diagram illustrating the steps performed in a method 200 for evaluating XPath expressions in XML document validation according to an embodiment of the invention. In an embodiment of the invention, one or more XPath expressions are evaluated during XML schema compilation time to identify the elements or attributed referenced in identity constraints. Evaluating XPath expressions at the compile time itself for identifying the identity constraints eliminates an additional overhead of using a full-fledged XPath processor at runtime of the XML processing system. In an embodiment of the invention, steps 205-220 are performed during compile time of the XML processing system.

At step 205, an XML schema is compiled and stored. The compiled XML schema includes the information about the structure of the XML document represented as a one-dimensional array of schema nodes, hereinafter referred to as one-dimensional schema node array. The XML schema includes identity constraints expressed using XPath expressions which refers to XML nodes in an XML document. Further, these XPath expressions included in the identity constraints are parsed at step 210. The identity constraints in the schema are analyzed and the XPath expressions therein are extracted. XPath refers to a standardized language used for identifying and querying data from XML documents. XPath treats an XML document as a logical ordered tree and describes how to locate specific elements (and attributes, processing instructions, etc.) in an XML document.

At step 215, the parsed XPath expressions are evaluated to identify the schema nodes in the XML schema corresponding to the XML nodes referred in the identity constraints. The extracted Xpath expressions are evaluated using the structure information available in the one-dimensional schema node array. XPath results are generated while evaluating the XPath expressions. Step 215 is performed at compile time of the XML processing system. Further, at step 220, the schema nodes corresponding to the Xpath results are identified and marked in the one-dimensional schema node array. In an embodiment of the invention, the identity constraints include a combination of 'key', 'keyref' and 'unique' constructs. Further, the identity constraints are enforced on the XML document without evaluating the XPath expressions at runtime at step 225. At run time, when a schema node marked as an identity constraint is encountered, particular action according to the identity constraint is taken. For example, in the case of enforcing 'unique' constraint, when an XML node corresponding to schema node marked as 'unique' is encountered during runtime, it may be entered into a list. While entering the node into the list, it is ensured that another node with the same value is not already present in the list. The list is maintained within the specified scope. Enforcing identity constraints is further explained using the sample XML schema provided below.

This embodiment of the invention evaluates the Xpath expressions specified in the identity constraints during compile time itself. This approach provides the advantage of avoiding XPath evaluation at the runtime which in turn improves performance and efficiency of the XML processing system. Further, embodiments of the invention can avoid a separate XPath processor at the runtime to evaluate XPath expressions.

Steps 215, 220 and 225 according to an embodiment of the invention are explained using an exemplary XML schema shown below. Embodiments of the invention including identifying and marking XML schema nodes as identity constraints are explained in the following example.

Sample XML schema:

<schema xmlns="http://www.w3.org/2001/XMLSchema" elementFormDefault="unqualified">

<annotation>

<documentation xml:lang="en">

Example Purchase Order schema
```
</documentation>
</annotation>
<element name="purchaseOrder">
<complexType>
   <sequence>
      <element name="place" type="placeType"/>
      <element name="items" type="itemsType"/>
   </sequence>
   <attribute name="orderDate" type="date"/>
</complexType>
<unique name="uniqueZipcode">
   <selector XPath="place/zip"/>
   <field XPath="@code"/>
</unique>
<key name="itemKey">
   <selector XPath="items/item"/>
   <field XPath="@number"/>
</key>
<keyref name="uniqueZipRef" refer="itemKey">
   <selector XPath="place/zip/item"/>
   <field XPath="@number"/>
</keyref>
</element>
<complexType name="placeType">
<sequence>
   <element name="zip" maxOccurs="unbounded">
      <complexType>
         <sequence>
            <element name="item"
                 maxOccurs="unbounded">
               <complexType>
                  <complexContent>
                     <restriction base="anyType">
                        <attribute name="number"
                             type="positiveInteger"/>
                        <attribute name="quantity"
                             type="positiveInteger"/>
                     </restriction>
                  </complexContent>
               </complexType>
            </element>
         </sequence>
         <attribute name="code" type="positiveInteger"/>
      </complexType>
   </element>
</sequence>
</complexType>
<complexType name="itemsType">
<sequence>
   <element name="item" maxOccurs="unbounded">
      <complexType>
         <simpleContent>
            <extension base="number">
               <attribute name="number"
                    type="positiveInteger"/>
            </extension>
         </simpleContent>
      </complexType>
   </element>
</sequence>
</complexType>
</schema>
```

In the above example, an element which is a complex type node named as 'purchase order' is defined. Element 'purchaseOrder' has a set of places and items defined as elements, and types of those elements are placeType and itemsType respectively. Element 'placeType' is further defined in the schema and has an element 'zip'. Further, the element 'purchase order' also has an attribute 'orderData'. In the unique constraint called as 'uniqueZipcode', unique selector XPath expression is 'place/zip' and the field XPath expression is the attribute 'code'. In this particular 'purchaseOrder' there may be several 'place' and 'items' defined, but the 'place' must have a child called 'zip' and 'zip' must have an attribute called 'code'. All the values of 'code' attributes should be unique for a given purchase order. In this example, 'purchaseOrder' may be defined as a scope since the unique specifier is specified inside the 'purchaseOrder'.

In an embodiment of the invention, when this XML schema is compiled, elements and attributes named as 'purchaseOrder', 'place', 'zip' etc. are stored as schema nodes in the schema node array. As a last part of the compilation process, the XPath expressions used in the identity constraints are evaluated using the information present in the schema node array. For example, for the XPath expression 'place/zip' with a scope as 'purchaseOrder', XPath evaluation starts by identifying the element 'purchaseOrder' as main element, and further looks for a child called as 'place' which should be a child of the element 'purchaseOrder'. The schema nodes called as 'place' and 'zip' will be further identified. In an embodiment of the invention, step 215 may be used to identify these schema nodes. Further, schema node 'zip' is marked as a selector and 'zip's' attribute called as 'code' is marked as a 'unique'. Step 220 is used to mark the schema nodes corresponding to the nodes specified in the 'unique' construct. The element 'purchase order' gets marked as a scope defining element. In a similar way, schema nodes corresponding to the XML nodes referenced in 'key' and 'keyref' constructs are identified and marked. At step 225, XML schema validator validates the documents by processing the SAX events received from the XML parser. For every 'unique', 'key' and 'keyref' construct in the XML schema, an identity constraint enforcer (for example, an identity constraint enforcing module 320 of FIG. 3) maintains a separate list of values at the respective scopes. As the StartOfElement (SOE) SAX events are received, the identity constraint enforcer checks to see if the schema node corresponding to the element in SAX event is marked as identity constraint node.

For 'unique' and 'key' constructs, when the End of Element (EOE) SAX event is received for the element corresponding to 'selector', the value for 'field' is computed. Further, a check is performed to find if the value for 'field' is already in the list maintained for 'unique' or 'key' construct at that scope. If the value already exists, it is a violation of 'unique' or 'key' constraint. If the value does not exist, the value is then stored in the list. For 'keyref' constructs, when the EOE SAX event is received for the element corresponding to 'selector', the value for 'field' is computed and stored in the list maintained for 'keyref' construct at that scope. When the EOE SAX event is received for the scope element, for example, 'purchaseOrder' element in the aforementioned sample XML schema, the values in the list maintained for 'keyref' are checked for existence in the list of values maintained for 'key'. If this value doesn't exist in the list of values maintained for 'key', then it is a violation of 'keyref' constraint.

Figure 3:
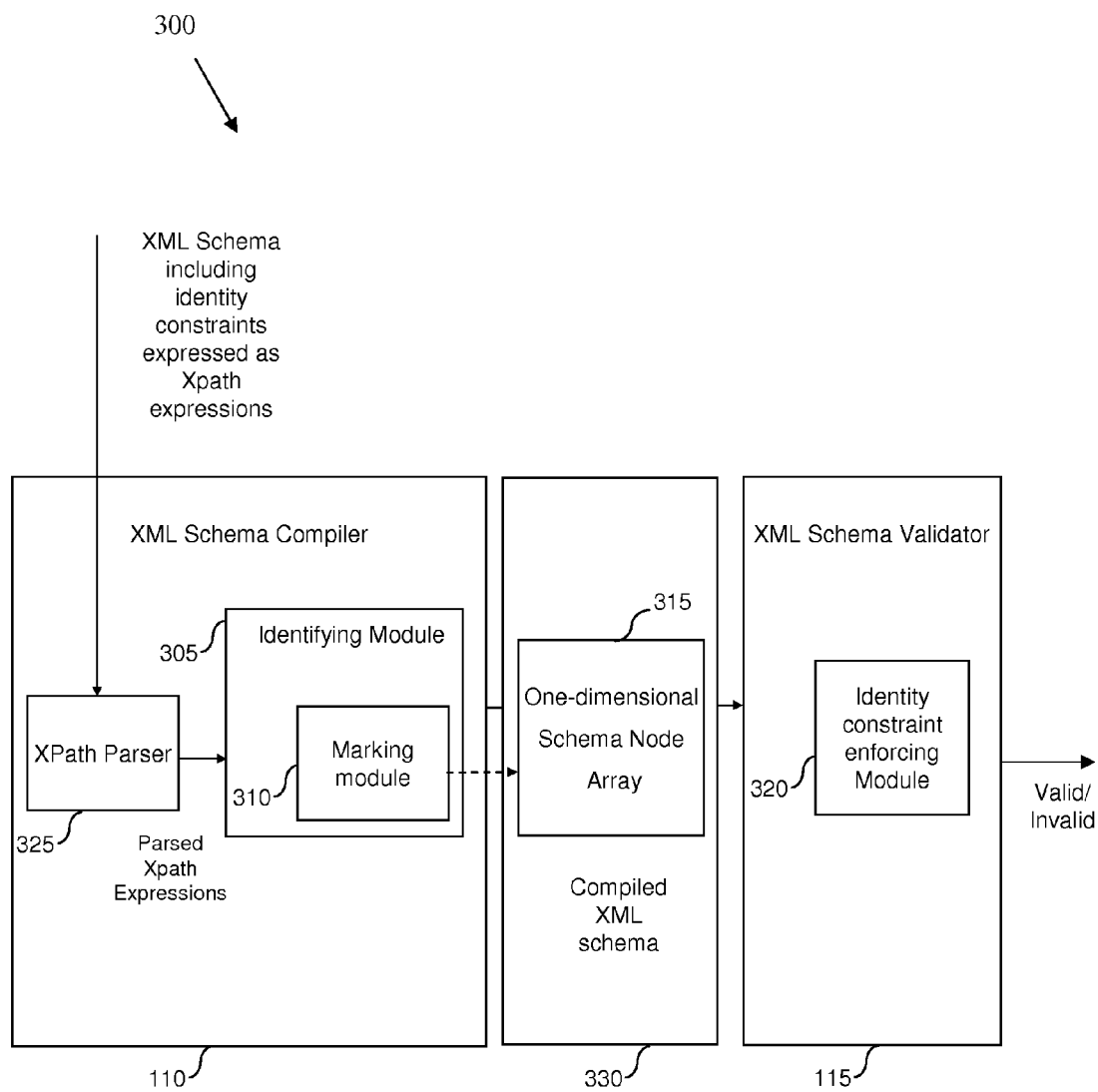
FIG. 3 is a block diagram illustrating an exemplary implementation of a system according to an embodiment of the invention.

FIG. 3 is a block diagram illustrating an exemplary implementation of a system 300 according to an embodiment of the invention. The system 300 includes an XML schema compiler 110 and an XML schema validator 115. The XML schema compiler 110 includes an identifying module 305, and an XPath parser 325. The identifying module 305 further includes a marking module 310. The XML schema validator 115 includes an identity constraint enforcing module 320.

Further, the compiled XML schema is stored in a one-dimensional schema node array 315 in the compiled XML schema block 330.

In an embodiment of the invention, the XML schema compiler 110 receives XML schema which includes identity constraints expressed using XPath expressions. The XPath parser 325 in the XML schema compiler 110 parses these XPath expressions and further supplies the parsed information to the identifying module 305. The XML schema compiler 110 compiles the XML schema and stores the compiled XML schema in the XML schema node array 315. In an embodiment of the invention, XML schema node array 315 represents the compiled format of the XML schema. Information stored in the XML schema node array 315 is used for validating the XML document. The one-dimensional schema node array 315 includes an entry in it corresponding to each of the type definitions of the elements and attributes of the XML schema. The one-dimensional schema node array 315 captures all the type definitions that are specified in the XML schema. Further, the identifying module 305 identifies the XML schema nodes corresponding to the XML nodes referred in identity constraints in the one-dimensional schema node array 315 using the parsed XPath expressions. In an embodiment of the invention, the XPath expressions are evaluated at the compile time of the system 300 and relevant information is stored. Further, the marking module 310 marks the schema nodes as identity constraint nodes which are identified by the identifying module 305.

Further, the compiled XML schema with identity constraint nodes marked, is supplied to the XML schema validator 115. The identity constraint enforcing module 320 in the XML schema validator 115, utilizes the identity constraint node markings and enforces these identity constraints on the XML document at the runtime and further XML document validation may be performed.

In an embodiment of the invention, XML schema compiler 110 and XML schema validator 115 may include one or more algorithms to perform respective functions.

One or more steps of the method illustrated in FIG. 2 may be implemented using a computer system. An exemplary computer system is explained in details in conjunction with FIG. 4.

Figure 4:
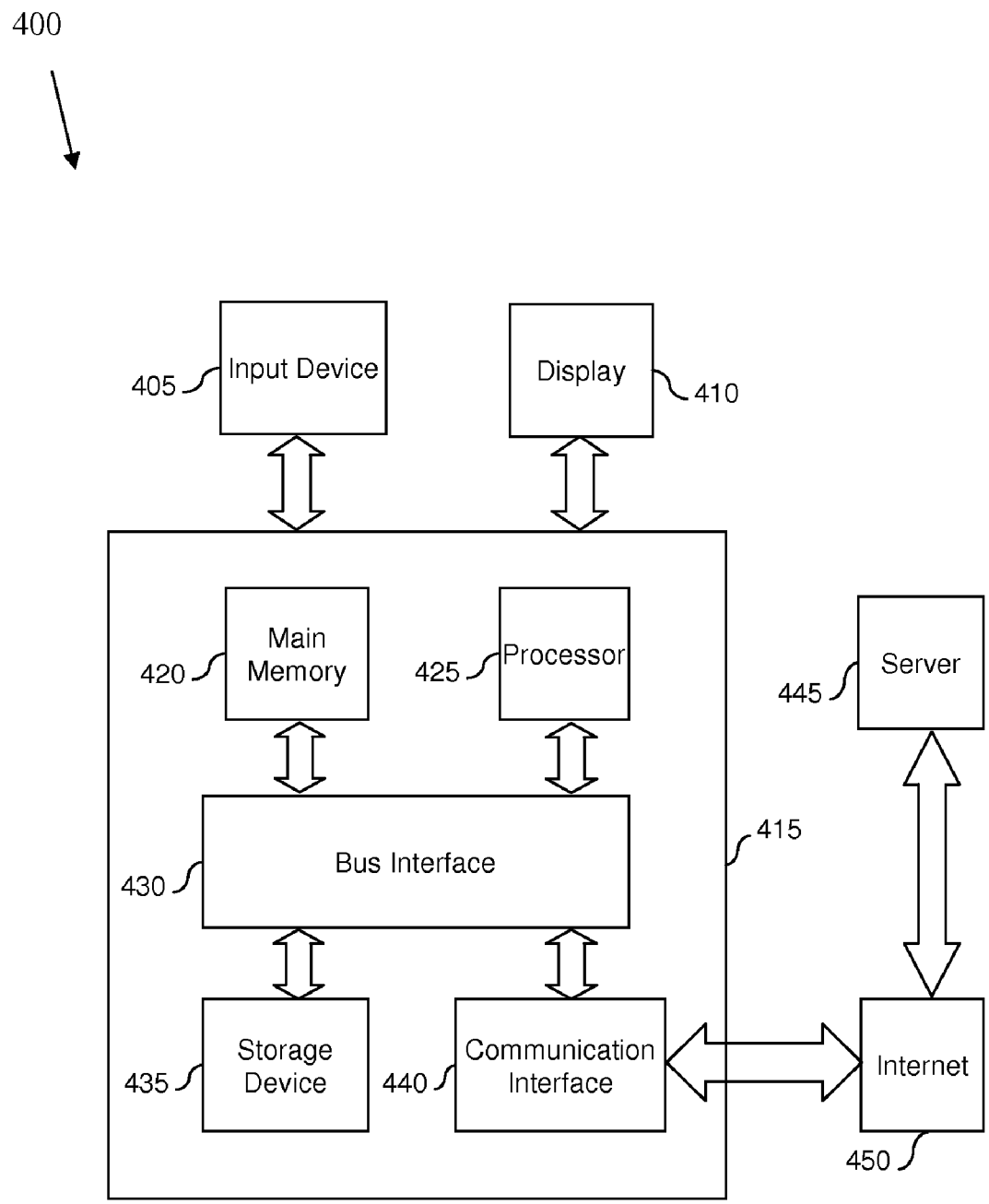
FIG. 4 is a block diagram of an exemplary computer system upon which embodiments of the invention may be implemented.

FIG. 4 is a block diagram of an exemplary computer system 400 upon which various embodiments of the invention may be implemented. Computer system 400 includes a processing unit 415 including a main memory 420, such as a Random Access Memory (RAM) or other dynamic storage device, coupled to a bus interface 430 for storing information and instructions to be executed by processor 425. A storage device 435, such as a magnetic disk or optical disk, is provided and coupled to bus interface 430 for storing information and instructions. Computer system 400 may be coupled via bus interface 430 to a display 410 for displaying information to a user. An input device 405, including alphanumeric and other keys, is coupled to bus interface 430 for communicating information and command selections to processor 425.

Embodiments of the invention are related to the use of computer system 400 for implementing the techniques described herein. According to one embodiment of the invention, those techniques are performed by computer system 400 in response to processor 425 executing one or more sequences of one or more instructions included in main memory 420. Such instructions may be read into main memory 420 from another machine-readable medium product, such as storage device 435. Execution of the sequences of instructions included in main memory 420 causes processor 425 to perform the method embodiment of the invention described herein. In alternative embodiments, hard-wired circuitry may be used in place of or in combination with software instructions to implement the invention. Thus, embodiments of the invention are not limited to any specific combination of hardware circuitry and software.

The term "machine-readable medium product" as used herein refers to any medium that participates in providing data that causes a machine to operation in a specific fashion. Examples of the machine-readable medium product include but are not limited to memory devices, tapes, disks, cassettes, integrated circuits, servers, online software, download links, installation links, and online links.

In an embodiment implemented using computer system 400, various machine-readable medium products are involved, for example, in providing instructions to processor 425 for execution. Computer system 400 also includes a communication interface 440 coupled to bus interface 430. Communication interface 440 provides a two-way data communication coupling to internet 450 that is coupled a server 445. Server 445 might transmit a requested code for an application program through internet 450 and communication interface 440.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A computer implemented method comprising:
   at compile time:
      parsing XPath expressions included in identity constraints of an XML schema;
      evaluating XPath expressions to identify one or more schema nodes in an XML schema corresponding to XML nodes referred in identity constraints as one or more XPath expressions, wherein one or more XPath expressions are evaluated at compile time;
      marking the one or more schema nodes identified as identity constraints with at least unique or key;
   at runtime:
      enforcing the identity constraints on an XML document without evaluating the XPath expressions; and
      responsive to encountering an XML node marked as unique or key, storing a value field associated with the XML node if another XML node having the same value is not already present in the list and indicating violation if the same value is already present.

2. The computer implemented method of claim 1 further comprising, prior to identifying:
   compiling an XML schema and generating compiled XML schema, wherein the compiled XML schema comprises a one-dimensional array of schema nodes corresponding to type definitions of elements and attributes defined in the compiled XML schema.

3. The computer implemented method of claim 1, wherein marking one or more schema nodes comprises:
   marking one or more schema nodes identified in a one-dimensional schema node array of the compiled XML schema.

4. The computer implemented method of claim 1, wherein the identity constraints comprises at least one of key, keyref and unique.

5. A computer implemented system comprising:
- an XPath parser, in an XML schema compiler, to parse XPath expressions included in identity constraints of an XML schema at compile time;
- an identifying module, in an XML schema compiler, to identify one or more schema nodes in an XML schema corresponding to XML nodes referred in identity constraints as one or more XPath expressions, wherein one or more XPath expressions are evaluated at compile time;
- a marking module for marking the one or more schema nodes identified as identify constraints with at least unique or key at compile time; and
- an identity constraint enforcing module, in an XML schema validator, for enforcing the identity constraints on an XML document without evaluating the one or more Xpath expressions specified in the identity constraints at runtime, and responsive to encountering an XML node marked as unique or key, storing a value field associated with the XML node if another XML node having the same value is not already present in the list and indicating violation if the same value is already present.

6. The computer implemented system of claim 5, further comprising:
- the XML schema compiler for compiling an XML schema and generating compiled XML schema wherein the compiled XML schema comprises a one-dimensional schema node array including one or more type definitions of elements and attributes defined in the compiled XML schema; and
- an XPath parser for evaluating the one or more XPath expressions at the compile time.

7. The computer implemented system of claim 5, wherein the marking module marks the one or more schema nodes in the compiled one-dimensional schema node array as nodes referred in identity constraints.

8. The computer implemented system of claim 5, wherein the identity constraints comprises at least one of key, keyref and unique.

9. A non-transitory machine-readable medium product, comprising instructions operable to cause a programmable processor to perform:
- at compile time:
  - parsing XPath expressions included in identity constraints of an XML schema;
  - evaluating XPath expressions to identify one or more schema nodes in an XML schema corresponding to XML nodes referred in identity constraints as one or more XPath expressions, wherein one or more XPath expressions are evaluated at compile time;
  - marking the one or more schema nodes identified as identity constraints with at least unique or key;
- at runtime:
  - enforcing the identity constraints on an XML document without evaluating the one or more XPath expressions; and
  - responsive to encountering an XML node marked as unique or key, storing a value field associated with the XML node if another XML node having the same value is not already present in the list and indicating violation if the same value is already present.

10. The machine-readable medium product of claim 9 further comprising instructions operable to cause a programmable processor to perform, prior to identifying:
- compiling an XML schema and generating compiled XML schema, wherein the compiled XML schema comprises a one-dimensional array including one or more type definitions of elements and attributes defined in the compiled XML schema.

11. The machine-readable medium product of claim 9, wherein marking one or more schema nodes comprises:
- marking one or more schema nodes in a compiled one-dimensional schema node array of the compiled XML schema as nodes referred in identity constraints.

12. The machine-readable medium product of claim 9, wherein the identity constraints comprises at least one of key, keyref and unique.

* * * * *